Figure 1:
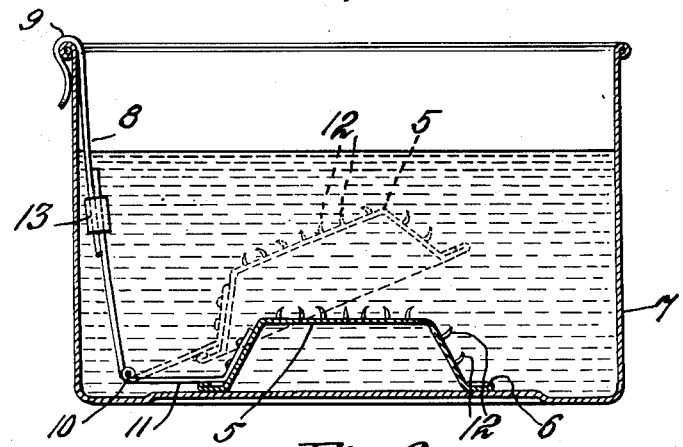

Jan. 24, 1956

A. F. ALBANO 2,732,185

AUTOMATIC STIRRER OR AGITATOR FOR
COOKING AND WASHING VESSELS
Filed Sept. 3, 1953

INVENTOR.
ALPHONSO F. ALBANO
BY
ATTORNEY

United States Patent Office 2,732,185
Patented Jan. 24, 1956

2,732,185

AUTOMATIC STIRRER OR AGITATOR FOR COOKING AND WASHING VESSELS

Alphonso F. Albano, Poughkeepsie, N. Y.

Application September 3, 1953, Serial No. 378,324

2 Claims. (Cl. 259—101)

The invention here disclosed relates to devices for agitating and stirring the contents of cooking and washing utensils.

Objects of the invention are to provide a device of this character which may be quickly applied to and used with most any ordinary cooking or washing pot or pan and which when so applied will serve to keep the contents of the vessel agitated or stirred sufficiently to permit uniform cooking or washing and to prevent sticking, burning or the like.

Special objects of the invention are to provide such an automatic stirrer in a simple, inexpensive form, consisting of the fewest possible parts adapted to be easily washed and cleaned.

Other desirable objects attained by the invention and the novel features of construction and combination of parts through which the purposes of the invention are attained, are set forth and will appear in the course of the following specification.

The drawing accompanying and forming part of the specification illustrates a present practical embodiment of the invention. Structure, however, may be modified and changed as regards the immediate illustration, all within the true intent and scope of the invention as hereinafter defined and claimed.

Figure 2:
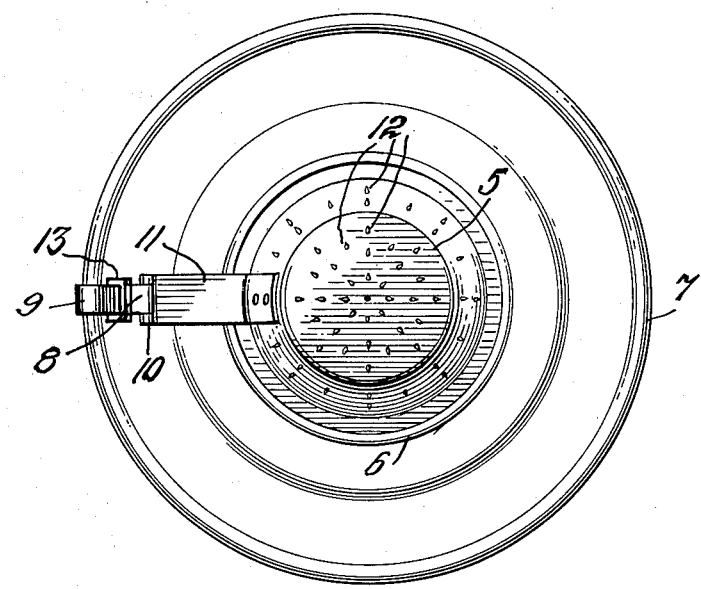

Fig. 1 in the drawing is a vertical sectional view of the invention as combined and used in an ordinary cooking pot;

Fig. 2 is a top plan view of the same.

In the embodiment of the invention illustrated, agitation is effected by means of an inverted, truncated, conical container 5, shaped like a small pie plate, having a flange 6 about the rim adapted to rest flat on the bottom of the pot 7, thus to form a trap for development of pressure, said container being pivotally held at one edge so that it may rise and fall with development and release of pressure.

The pivotal retention of the pressure trapping member is shown provided by a link 8 hooked at 9 over the rim of the pot and carrying a pivot or hinge connection 10 at its lower end with a lug or lever 11 attached to the inclined side wall of the pressure container.

The link 8 may be in the form of a metallic strip which may be bent to suit the shape of the pot and to support the hinge 10 off the bottom of the pot while leaving the flange 6 of the container in pressure sealing engagement with the bottom of the pot.

With this construction and arrangement pressure will quickly build up within the relatively flat and shallow container and acting upward against the inclined side wall, will lift the container, about the hinge as a center, spilling the contents into the body of the pot to effectively agitate and stir the same. The rapidity of such action may be governed by the heat applied, the amount of material and other such conditions.

While generally it may be preferred to keep the interior of the pressure accumulating container clear and free of projections or obstructions, as shown, it is contemplated that the exterior of the container may be equipped with projections such as vanes, points or hooks 12 which will contact or engage with the contents to effect circulation, stirring or agitation of the surrounding material.

The invention is of particularly simple, low cost construction, readily applicable to present cooking and washing utensils, easily cleaned, adjusted and kept in proper condition.

To provide quick adjustment of the supporting link for pots of different sizes, the link may be made extensible and contractible by means of a telescopic slip-joint such as indicated at 13. This may be a friction-tight slidable connection which while easily adjusted will hold in the adjusted position.

What is claimed is:

1. For agitating and stirring the contents of a cooking or washing vessel, the combination comprising a cooking or washing vessel, a support removably mounted in said vessel and an inverted, generally conical, closed pressure accumulating container hingedly connected with said support and having a flange about the lower edge of the same positioned by said support in sealing engagement with the bottom of the vessel.

2. For agitating and stirring the contents of a cooking or washing vessel, the combination comprising a cooking or washing vessel, an upright support provided with a hook at the upper end removably engaged over the rim of said vessel and an inverted, generally conical, pressure accumulating container hingedly connected the lower end of said support and having a flange about the lower edge of the same in sealing engagement with the bottom of the vessel and provided with exteriorly projecting means for engagement with contents of the vessel in which the device is located.

References Cited in the file of this patent

UNITED STATES PATENTS

| | | |
|---|---|---|
| 405,509 | Smith | June 18, 1889 |
| 419,585 | Crapo | Jan. 14, 1890 |
| 558,515 | Parker | Apr. 21, 1896 |
| 1,428,822 | Walling | Sept. 12, 1922 |

FOREIGN PATENTS

| | | |
|---|---|---|
| 24,652 | Switzerland | Mar. 5, 1902 |